(12) United States Patent
Rhee et al.

(10) Patent No.: US 11,118,643 B2
(45) Date of Patent: Sep. 14, 2021

(54) BRAKE DISC

(71) Applicants: HYUNDAI MOTOR COMPANY, Seoul (KR); KIA MOTORS CORPORATION, Seoul (KR); SEOHAN INDUSTRY CO., LTD., Chungcheongbuk-do (KR); HYUNDAI SUNGWOO CASTING CO., LTD., Seoul (KR)

(72) Inventors: Yoon Joo Rhee, Suwon-si (KR); Jae Young Lee, Yongin-si (KR); Yoon Cheol Kim, Suwon-si (KR); Byung Chan Lee, Hwaseong-si (KR); Jin Han, Bucheon-si (KR); Min Gyun Chung, Yongin-si (KR); Jeong Ho Shin, Daegu (KR); Jae Seok Lee, Hwaseong-si (KR)

(73) Assignees: Hyundai Motor Company, Seoul (KR); Kia Motors Corporation, Seoul (KR); Seohan Industry Co Ltd, Jincheon-gun (KR); Hyundai Sungwoo Casting Co Ltd, Seoul (KR)

( * ) Notice: Subject to any disclaimer, the term of this patent is extended or adjusted under 35 U.S.C. 154(b) by 63 days.

(21) Appl. No.: 16/676,313

(22) Filed: Nov. 6, 2019

(65) Prior Publication Data

US 2020/0191214 A1 Jun. 18, 2020

(30) Foreign Application Priority Data

Dec. 12, 2018 (KR) .......................... 10-2018-0159640

(51) Int. Cl.
*F16D 65/12* (2006.01)
*F16D 65/02* (2006.01)

(52) U.S. Cl.
CPC ......... *F16D 65/123* (2013.01); *F16D 65/128* (2013.01); *F16D 2065/1328* (2013.01);
(Continued)

(58) Field of Classification Search
CPC ........ F16D 65/12; F16D 65/78; F16D 65/123; F16D 65/128
(Continued)

(56) References Cited

U.S. PATENT DOCUMENTS 467,694 A    1/1892  Wagandt
6,357,557 B1 * 3/2002 Ponio ...................... F16D 65/12
                                                     164/111

(Continued)

FOREIGN PATENT DOCUMENTS

KR     10-1499125 B1     3/2015
WO     2011/157352 A1    12/2011

*Primary Examiner* — Christopher P Schwartz
(74) *Attorney, Agent, or Firm* — Morgan, Lewis & Bockius LLP

(57) ABSTRACT

A brake disc, in which a hat part that is mounted on a hub and a disc part that provides friction surfaces with brake pads are made of different materials and are combined, includes: a plurality of bridges protruding and circumferentially arranged around an edge of the hat part for coupling to the disc part; a plurality of vanes defining a channel for air flow; and a plurality of coupling pillars, which are fixedly in contact with the bridges, respectively, arranged between a pair of disc plates. The coupling pillars are fixedly in contact with both sides of the bridges while exposing front ends of the bridges.

4 Claims, 8 Drawing Sheets

(52) U.S. Cl.
CPC ............... *F16D 2200/0013* (2013.01); *F16D 2250/0007* (2013.01)

(58) Field of Classification Search
USPC .............. 188/18 A, 218 XL, 264 A, 264 AA
See application file for complete search history.

(56) References Cited

U.S. PATENT DOCUMENTS

| | | | | |
|---|---|---|---|---|
| 6,626,273 | B1* | 9/2003 | Baumgartner ........ | F16D 65/123 188/218 XL |
| 8,336,682 | B2* | 12/2012 | Mears ................... | F16D 65/128 188/218 XL |
| 8,893,863 | B2* | 11/2014 | Meckel .................. | F16D 65/12 188/218 XL |
| 10,215,245 | B2* | 2/2019 | Wagner ................. | F16D 65/123 |
| 2004/0124047 | A1* | 7/2004 | Oberti ................... | B22C 7/06 188/218 XL |
| 2009/0272609 | A1* | 11/2009 | Karthik .................. | F16D 65/12 188/264 AA |
| 2011/0061980 | A1* | 3/2011 | Anderson .............. | B22D 19/16 188/218 XL |
| 2014/0326551 | A1* | 11/2014 | Anderson .............. | B22D 19/00 188/218 XL |

* cited by examiner

[FIG. 1]
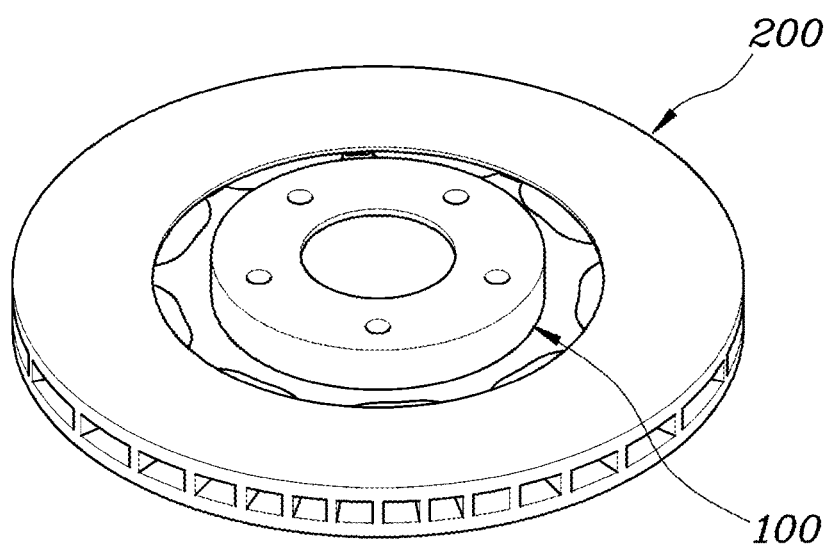

[FIG. 2]
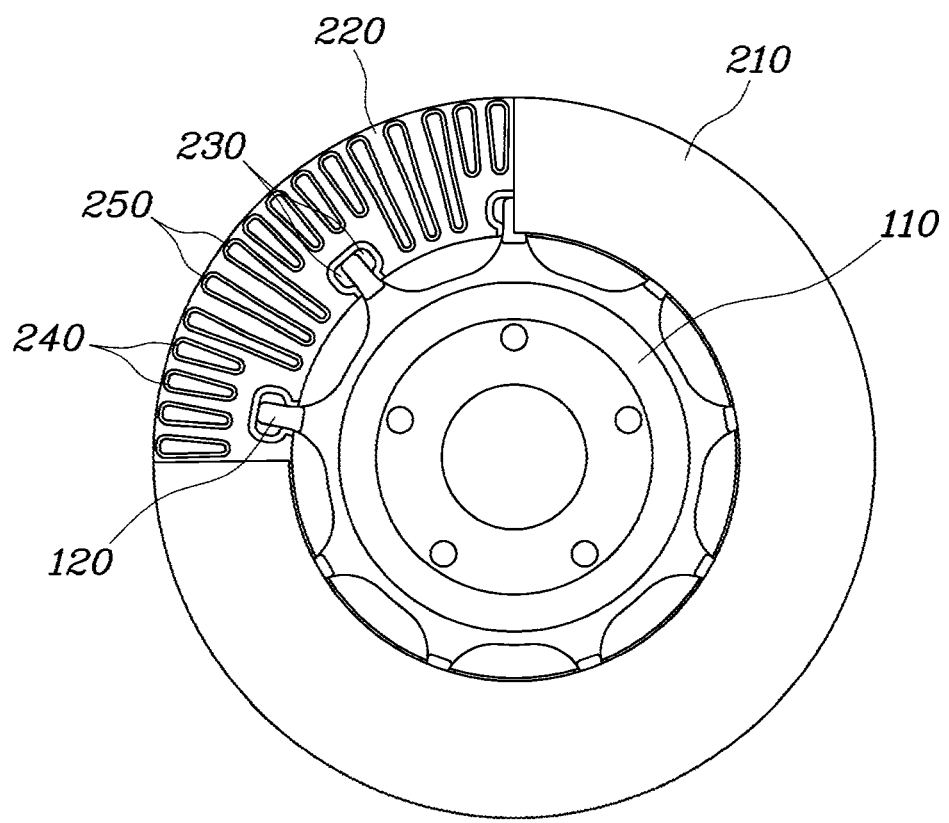

[FIG. 3]
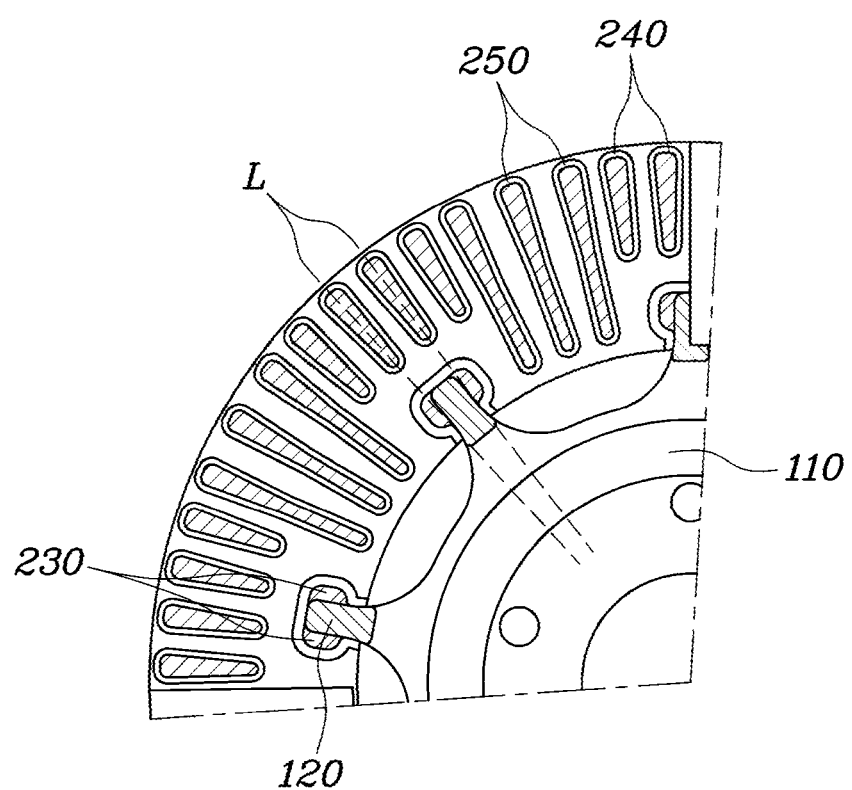

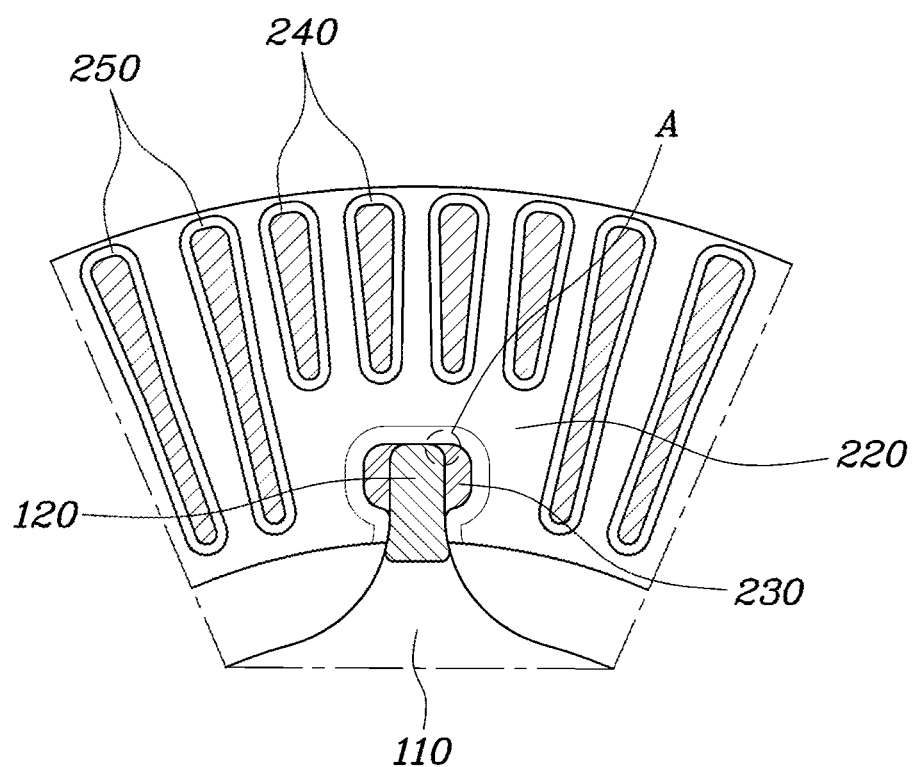
[FIG. 4]

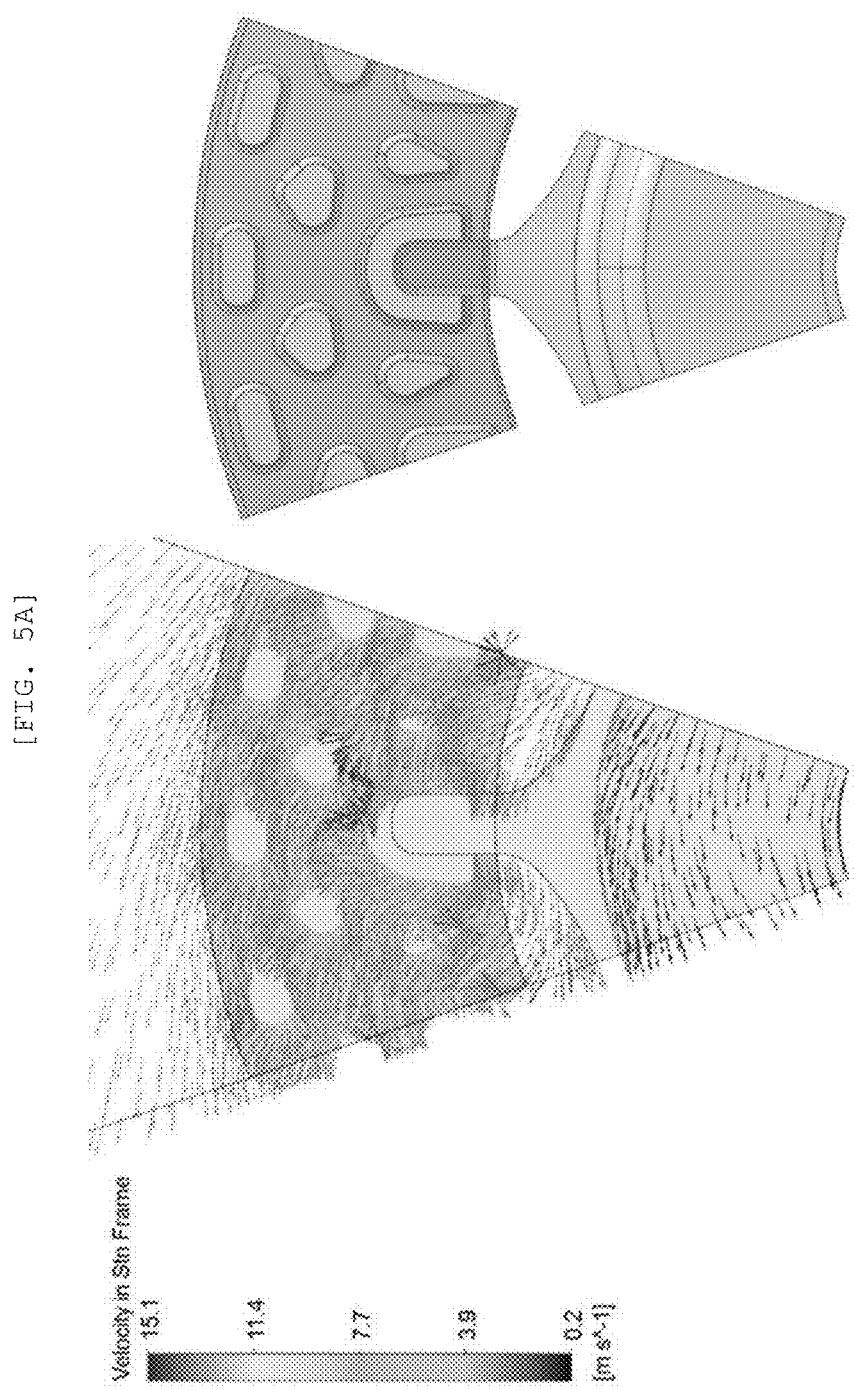
[FIG. 5A]

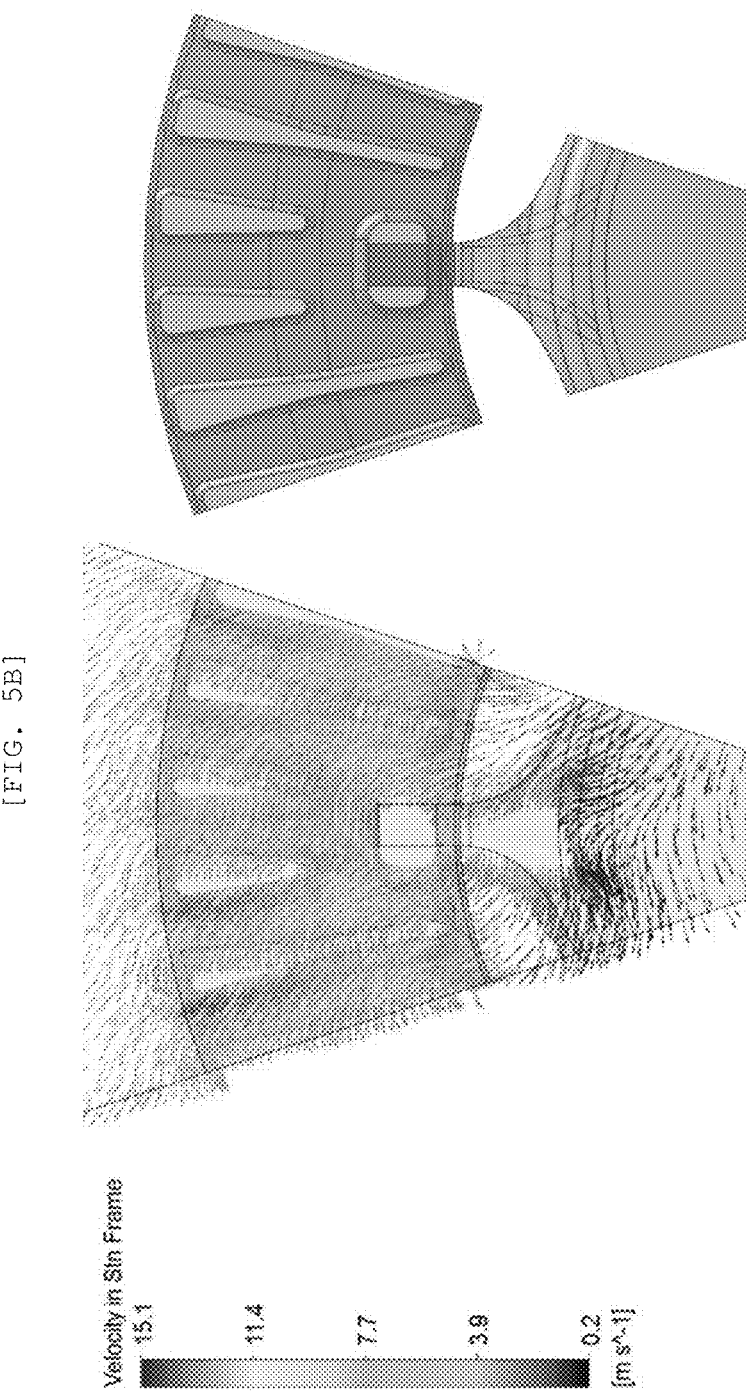
[FIG. 5B]

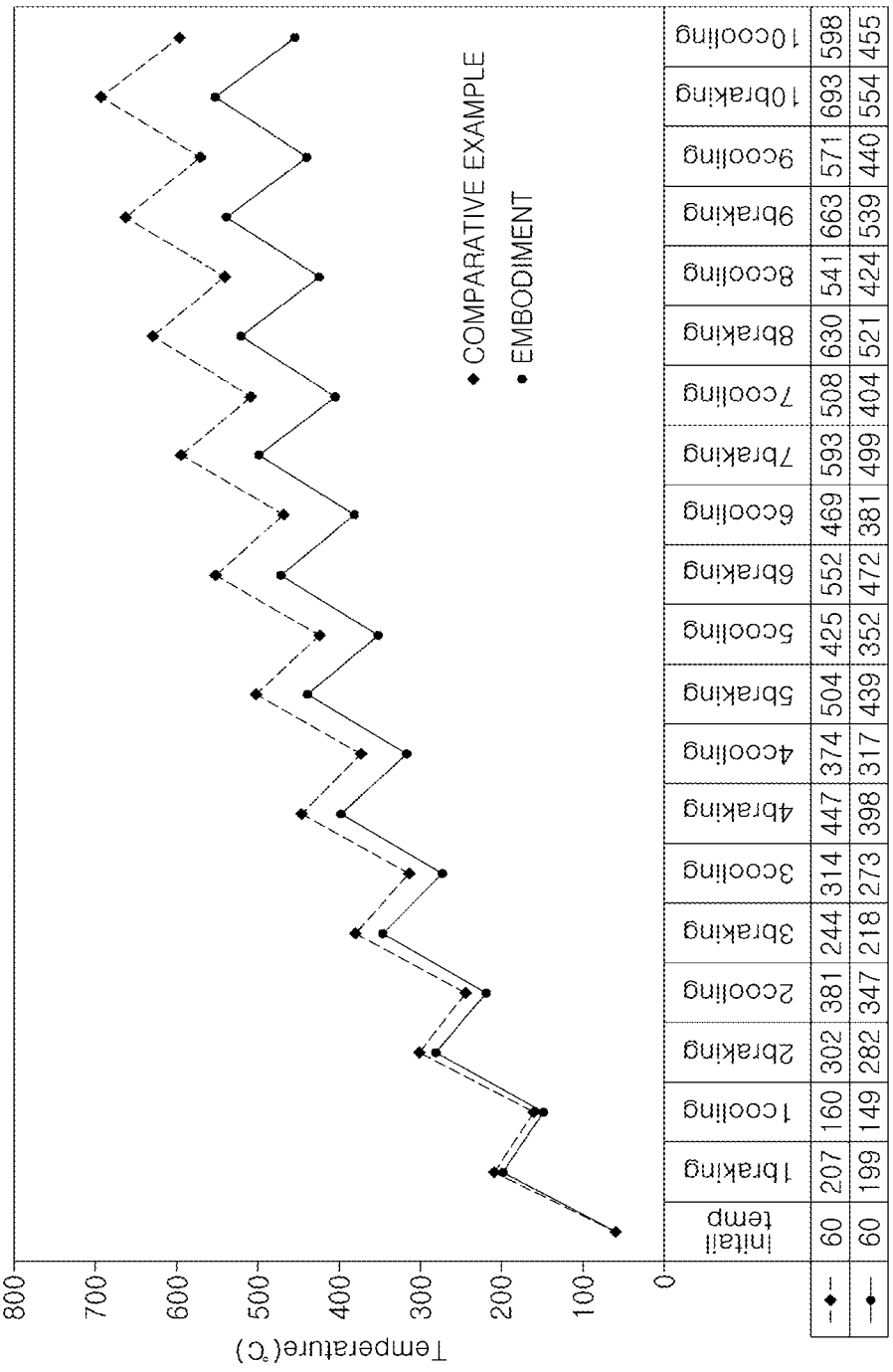
[FIG. 6]

[FIG. 7]

| ITEM | 1.0R | 1.5R | 2.0R | 2.5R | UNIT : MPa |
|---|---|---|---|---|---|
| ANALYSIS RESULT VALUE | 302.95 | 269.59 | 248.22 | 237.62 | |
| IMAGE | | | | | |
| DETERMINATION | STRENGTH UNSATISFIED | STRENGTH UNSATISFIED | STRENGTH SATISFIED | STRENGTH SATISFIED | |
| ITEM | 3.0R | 3.5R | 4.0R | | 1. MATERIAL YTS VALUE : 250MPa 2. RESULT VALUE EXTRACTED: AVERAGE VALUE AT EACH NODE APPLIED |
| ANALYSIS RESULT VALUE | 247.25 | 264.32 | 289.56 | | |
| IMAGE | | | | | |
| DETERMINATION | STRENGTH SATISFIED | STRENGTH UNSATISFIED | STRENGTH UNSATISFIED | | |

BRAKE DISC

CROSS-REFERENCE TO RELATED APPLICATION

This application claims priority to Korean Patent Application No. 10-2018-0159640, filed on Dec. 12, 2018 in the Korean Intellectual Property Office, the disclosure of which is incorporated herein by reference.

TECHNICAL FIELD

The present disclosure relates to a brake disc, and more particularly, to a brake disc that can stably maintain coupling strength and can secure heat dissipation against heat flow at the joint of a hat part and a disc part that are made of different materials.

BACKGROUND

A brake system is a system for decelerating or stopping a driving vehicle or keeping a vehicle stopped.

Such a brake system is composed of a braking force generator that generates force for braking, a brake that decelerates or stops a vehicle using the force generated by the braking force generator, pipes, pistons, and valves for transmitting the force from the braking force generator to the brake, and accessories for power assistance. The brake is classified into a drum brake and a disc brake in terms of structure.

In particular, as for the disc brake, a brake disc is fixed to each wheel of a vehicle and a pair of brake pad that can be closed or opened is disposed on the left and right sides of each of the brake disc. That is, when brake pads are forced into close contact with a brake disc rotating with a wheel, the vehicle is braked by the friction.

The brake disc is divided into a hat part that is mounted on a hub and a disc part that provides friction surfaces with brake pads, and the hat part and the disc part were both made of gray cast iron in the related art. The reason of generally using gray cast iron to manufacture brake discs is because gray cast iron has advantages such as excellent castability, high thermal conductivity, excellent damping capacity, excellent abrasion resistance, low manufacturing cost, etc.

However, if anti-corrosion treatment is not separately applied to gray cast iron, red rust is very easily generated on the surface, so that the quality of the external appearance is deteriorated and judder is likely to be caused by the rust. Further, gray cast iron has a high specific weight, so it is unable to satisfy the demand to reduce the weight of vehicles.

In order to achieve weight reduction without deteriorating the performance of brake discs, a method of casting a hat part using ductile cast iron that is high-strength cast iron and then casting a disc part using cast iron in a predetermined time has been used. According to the above method, a hat part made of ductile cast iron having relatively high strength is thinner than a hat part made of gray cast iron, so weigh reduction can be achieved.

However, since a hat part and a disc part are manufactured with a predetermined time difference, a technology that can stably maintain coupling strength of a hat part and a disc part has been continuously studied.

The description provided above as a related art of the present disclosure is just for helping understanding the background of the present disclosure and should not be construed as being included in the related art known by those skilled in the art.

SUMMARY

The present disclosure has been made in order to solve the above-mentioned problems in the prior art and an aspect of the present disclosure is to provide a brake disc that can stably maintain coupling strength and can secure heat dissipation against heat flow at the joint of a hat part and a disc part that are made of different materials.

In view of the above aspect, a brake disc according to an aspect of the present disclosure may be a brake disc in which a hat part that is mounted on a hub and a disc part that provides friction surfaces with brake pads are made of different materials and are combined. A plurality of bridges protrudes and is circumferentially arranged around an edge of the hat part for coupling to the disc part, a plurality of vanes defining a channel for air flow are arranged between a pair of disc plates, and a plurality of coupling pillars fixedly in contact with the bridges, respectively, are arranged between the pair of disc plates, and the coupling pillars are fixed in contact with both sides of the bridges while exposing front ends of the bridges.

Joint surfaces of the front ends of the bridges and the front ends of the coupling pillars are curved surfaces.

The radius of curvature (R) of the joint surfaces of the front ends of the bridges and the front ends of the coupling pillars is 2.0R~3.0R.

The vanes may be dot-type vanes arranged at predetermined intervals between the pair of disc plates.

The vanes may be straight vanes circumferentially spaced apart from each other between the pair of disc plate.

The coupling pillars may be disposed in straight lines with vanes selected from the straight vanes.

The vanes include a plurality of first vanes disposed in a front area of the bridges and the coupling pillars and a plurality of second vanes disposed in areas between sets of the bridges and the coupling pillars, and the first vanes are formed shorter than the second vanes to form a channel for the flow of air between the first vanes and the front ends of the bridges.

According to an embodiment of the present disclosure, it is possible to stably maintain the coupling strength by improving the shapes of bridges of a hat part and coupling pillars of a disc part that are coupling portions of the hat part and the disc part. Further, it is possible to secure excellent heat dissipation against heat flow by improving a channel for the flow of air.

BRIEF DESCRIPTION OF THE DRAWINGS

The above and other aspects, features and advantages of the present disclosure will be more apparent from the following detailed description taken in conjunction with the accompanying drawings, in which:

FIG. 1 is a perspective view showing a brake disc according to an exemplary embodiment of the present disclosure;

FIG. 2 is a partial cut plan view showing the brake disc according to an exemplary embodiment of the present disclosure;

FIGS. 3 and 4 are partial enlarged cross-sectional views showing main parts of the brake disc according to an exemplary embodiment of the present disclosure;

FIGS. 5A and 5B are images showing heat-flow heat dissipation characteristics according to a comparative example and an exemplary embodiment;

FIG. 6 is a graph showing thermal capacity estimation results according to a comparative example and an exemplary embodiment; and FIG. 7 is a table showing coupling strength estimation results according to a comparative example and an exemplary embodiment.

DETAILED DESCRIPTION OF THE EXEMPLARY EMBODIMENTS

Hereinafter, embodiments of the present disclosure are described in detail with reference to the accompanying drawings. However, the present disclosure is not limited to the following embodiments and can be implemented in various ways different from one another, and the embodiments are provided to complete the present disclosure and to completely inform those skilled in art of the scope of the present disclosure. The same components are given the same reference number in the drawings.

FIG. 1 is a perspective view showing a brake disc according to an exemplary embodiment of the present disclosure, FIG. 2 is a partial cut plan view showing the brake disc according to an exemplary embodiment of the present disclosure, and FIGS. 3 and 4 are partial enlarged cross-sectional views showing main parts of the brake disc according to an exemplary embodiment of the present disclosure.

As shown in the figures, a brake disc according to an exemplary embodiment of the present disclosure is formed by combining a hat part 100 mounted on a hub and a disc part 200 providing friction surfaces with brake pads.

The hat part 100, which is a part made of ductile cast iron that is high-strength cast iron through casting, includes a body 110 having a mounting hole at the center in which a hub is mounted, and a plurality of bridges 120 radially protruding and circumferentially spaced apart from each other around the body 110 for coupling to the disc part 200.

The disc part 200, which is a part made of common cast iron through casting, includes a pair of disc plates 210 and 220, a plurality of vanes 240 and 250 forming a channel for air between the pair of disc plates 210 and 220, and a plurality of coupling pillars 230 fixed to the bridges 120 in close contact with the bridges 120 between the pair of disc plates 210 and 220. The pair of disc plates 210 and 220, the vanes 240 and 250, and the coupling pillars 230 are integrally formed by casting.

Joint surfaces are formed between a bridge 120 of the hat part 100 and a coupling pillar 230 of the disc part 200. The joint surfaces between both sides of a bridge 120 and a side of a coupling pillar 230 are flat surfaces and the joint surface (A in FIG. 4) of the front end of the bridge 120 and the front end of the coupling pillar 230 is a curved surfaces. Accordingly, the front end of a coupling pillar 230 surrounds the front end of a bridge 120.

However, the front ends of the bridges 120 are not surrounded by the coupling pillars 230, but exposed to a channel for air in this embodiment. In detail, the coupling pillars 230 are provided in pairs and a pair of coupling pillar 230 is fixed in close contact with both sides of a bridge 120 with the front end of the bridge 120 exposed. For example, a pair of coupling pillars 230 is disposed in the shape of "11" in close contact with both sides of a bridge 120. Accordingly, the number of coupling pillars 230 may be a double of the number of bridges 120.

As described above, since the joint surfaces of the front end of a bridge 120 and the front ends of coupling pillars 230 are curved surfaces and the front end of the bridge 120 is exposed to the channel, the radius of curvature (R) of the joint surface of the front end of a bridge 120 and the front end of a coupling pillar 230 may be limited in order to maintain the coupling strength of the joint at a desired level.

For example, the radius of curvature (R) of the joint surface of the front end of a bridge 120 and the front end of a coupling pillar 230 may be 2.0R~3.0R. When the radius of curvature (R) of the joint surface of the front end of a bridge 120 and the front end of a coupling pillar 230 is out of the proposed range, yield strength (YTS) of 250 MPa or less required for brake discs cannot be achieved.

A channel for air is formed in the disc part 200 by disposing a plurality of vanes 240 and 250 between a pair of disc plate 210 and 220.

For example, the vanes may be dot-type vanes (not shown) that are disposed at predetermined intervals between the pair of disc plates 210 and 220.

Alternatively, the vanes 240 and 250 may be straight vanes 240 and 250 that are disposed at circumferential intervals between the pair of disc plates 210 and 220. The term 'straight' not only means the meaning of 'straight' in a dictionary, but also includes various shapes such as a long shape with a larger length than the width, as shown in the figures.

The vanes may be vanes having various patterns in this embodiment other than the proposed dot-type vanes and straight vanes 240 and 250.

However, a channel for air is formed by the shape and pattern of vanes and heat flow is determined by the channel. A straight channel can provide maximum heat dissipation ability according to heat flow, so that the vanes 240 and 250 may be straight vanes 240 and 250 in this embodiment.

As shown in FIG. 3, the coupling pillars 230 having the shape of "11" may be disposed in straight lines L with vanes 240 selected from straight vanes.

The lengths of the straight vanes 240 and 250 circumferentially arranged at predetermined intervals may be changed to form the coupling pillars 230.

For example, a plurality of straight vanes 240 and 250 is respectively divided into a plurality of first vanes 240 disposed in the front areas of bridges 120 and coupling pillar 230 and a plurality of second vanes 250 disposed in the areas between sets of bridges 120 and coupling pillars 230. The first vanes 240 may be formed shorter than the second vanes 250 so that a channel for air is formed between the first vanes 240 and the front ends of the bridges 120.

A brake disc having this configuration according to the present disclosure is compared with a comparative example in the following description.

First, heat-flow heat dissipation characteristics according to the shapes of coupling pillars are considered.

Straight vanes were formed and 11-shaped open-type coupling pillars were formed such that the front ends of bridges are exposed to a channel for the flow of air in an embodiment, while dot-type vanes were formed and U-shaped closed-type coupling pillars surrounding the front ends of bridges were formed in a comparative example.

Heat-flow heat dissipation characteristics of the brake discs according to the embodiment and the comparative example were measured and the results are shown in FIGS. 5A and 5B.

FIG. 5A is an image showing the heat-flow heat dissipation characteristic according to the comparative example, and FIG. 5B is an image showing the heat-flow heat dissipation characteristic according to an exemplary embodiment.

As can be seen from FIGS. 5A and 5B, the heat-flow heat dissipation characteristic was remarkably improved in the embodiment as compared with the comparative example. Accordingly, the maximum measured temperature of heat generated inside disc plates was 693° C. in the comparative example, while the maximum measured temperature of heat generated inside disc plates was 554° C. in the embodiment.

Accordingly, it could be found out that the case in which straight vanes are formed and 11-shaped open-type coupling pillars are formed is advantageous in terms of a heat-flow heat dissipation characteristic in comparison to the case in which dot-type vanes are formed and U-shaped closed-type coupling pillars are formed.

Further, thermal capacities were estimated while braking and cooling were repeatedly applied to the brake discs according to the comparative example and the embodiment, and the results were shown in FIG. 6.

As can be seen from FIG. 6, the more the braking and cooling were repeated, the larger the temperature difference and the temperature difference was up to about 140° C. in the last braking.

Coupling strength was checked while the radius of curvature (R) of the joint surface of the front ends of bridges and the front ends of coupling pillars were variously changed, and the result was shown in FIG. 7.

As can be seen from FIG. 7, the radius of curvature (R) of the joint surface satisfied the yield strength (YTS) of 250 MPa or less required for brake discs, within the range of 2.0R~3.0R for deformation due to heat generated on the friction portion.

Although the present disclosure was described above with reference to the accompanying drawings and exemplary embodiments, the present disclosure is not limited thereto, but is limited to the following claims. Accordingly, those skilled in the art may change and modify the present disclosure in various ways without departing from the spirit of the claims.

What is claimed is:

1. A brake disc, in which a hat part that is mounted on a hub and a disc part that provides friction surfaces with brake pads are made of different materials and are combined, comprises:
   a plurality of bridges protruding and circumferentially arranged around an edge of the hat part for coupling to the disc part;
   a plurality of vanes, which defines a channel for air flow, arranged between a pair of disc plates; and
   a plurality of coupling pillars, which are fixedly in contact with the plurality of bridges, respectively, arranged between the pair of disc plates,
   wherein the plurality of coupling pillars are fixedly in contact with both sides of the plurality of bridges while exposing front ends of the plurality of bridges,
   wherein joint surfaces, of the front ends of the plurality of bridges and front ends of the plurality of coupling pillars, are curved,
   wherein a radius of curvature of each of the joint surfaces of the front ends of the plurality of bridges and the front ends of the plurality of coupling pillars is 2.0R-3.0R, and
   wherein a yield strength of the brake disc is 250 MPa or less.

2. The brake disc of claim 1, wherein the plurality of vanes are straight vanes circumferentially spaced apart from each other between the pair of disc plates.

3. The brake disc of claim 2, wherein the plurality of coupling pillars are disposed in straight lines with vanes selected from the straight vanes.

4. The brake disc of claim 2, wherein the plurality of vanes include:
   a plurality of first vanes disposed in a front area of the bridges and the coupling pillars; and
   a plurality of second vanes disposed in areas between sets of the bridges and the coupling pillars, and
   the plurality of first vanes have lengths shorter than lengths of the plurality of second vanes to define the channel for the air flow between the plurality of first vanes and the front ends of the plurality of bridges.

* * * * *